United States Patent [19]

Hatakeyama et al.

[11] Patent Number: 4,738,096

[45] Date of Patent: Apr. 19, 1988

[54] METAL CORD

[75] Inventors: Koji Hatakeyama; Masahiro Kusuda, both of Kitakyushu, Japan

[73] Assignee: Tokyo Rope Mfg. Co., Ltd., Tokyo, Japan

[21] Appl. No.: 2,138

[22] Filed: Jan. 12, 1987

[30] Foreign Application Priority Data

Jan. 17, 1986 [JP] Japan .................. 61-7470

[51] Int. Cl.⁴ .................. D02G 3/48; B60C 9/00
[52] U.S. Cl. .................. 57/206; 57/212; 57/236; 57/902; 152/451; 152/527
[58] Field of Search .................. 57/206, 207, 236, 212, 57/218, 237, 902; 152/451, 527, 556, 557

[56] References Cited

U.S. PATENT DOCUMENTS

| | | | |
|---|---|---|---|
| 4,258,543 | 3/1981 | Canevari et al. | 57/212 |
| 4,333,306 | 6/1982 | Yamashita et al. | 57/206 |
| 4,399,853 | 8/1983 | Morimoto et al. | 57/902 X |
| 4,509,318 | 4/1985 | Yoneda | 57/212 |
| 4,516,395 | 5/1985 | Palmer et al. | 57/236 X |
| 4,545,190 | 10/1985 | Rye et al. | 57/212 X |
| 4,572,264 | 2/1986 | Umezawa et al. | 152/451 |
| 4,586,324 | 5/1986 | Mizuma | 57/902 X |
| 4,644,989 | 2/1987 | Charvet et al. | 152/451 |

Primary Examiner—John Petrakes
Attorney, Agent, or Firm—Frishauf, Holtz, Goodman & Woodward

[57] ABSTRACT

An open type metal cord has a plurality of cord units each constituted by at least one preformed metal wire member. The wire members within a given cord unit have the same preforming ratio but have a different ratio from that of the wire members within another cord unit. A difference between the largest preforming ratio and the smallest preforming ratio in cord units falls within the range of 0.20 to 0.40. In this case, the maximum preforming ratio possible for the wire members is 1.65 and the minimum preforming ratio possible for the wire members is 1.05. A total number of wire members constituting a metal cord according to the present invention is 3 to 5.

6 Claims, 3 Drawing Sheets

METAL CORD

BACKGROUND OF THE INVENTION

1. Field of the Invention

The present invention relates to a metal cord for reinforcing rubber products such as tires and belts.

2. Description of the Prior Art

Metal cords such as steel cords have been used to reinforce rubber products such as tires and belts. In recent years, in order to improve durability and anti-fatigue properties of cords under humid, corrosive circumstances, a so-called open type cord is popular. This cord is obtained by loosely twisting a plurality of wires a, as shown in FIG. 1. In a conventional open type steel cord, rubber permeates into the cord through spaces between adjacent wires a, and moisture, salt water or the like does not enter into the cord. As a result, durability and anti-fatigue properties of the cord are improved. In a cord of this type, a preforming ratio of each wire normally falls within the range of 1.05 to 1.40, and wires a are preformed almost identically.

The preforming ratio as used in the specification and the appended claims means to form wire members constituting a cord in a spiral shape having the same pitch and diameter (Dc) as those of the finished cord and is given by a quotient (Df/Dc) obtained by dividing spiral diameter Df by diameter Dc of the close packed cord. The preforming ratio of wire members in an open type cord exceeds 1.

According to the test results of the present inventors, the diameter of each wire in a conventional steel cord is as small as about 0.15 to 0.38 mm. When tension acts on the cord, the spiral pattern preformed in each wire is elongated along the direction of tension. Upon an increase in tension force, the distance between the adjacent wires is decreased. In the worst case, it is difficult to allow permeation of rubber into the cord. The critical tension force causing the state described above varies according to the constitutions and wire diameters of the cords. In steel cords disclosed in Japanese Patent Disclosure (Kokai) No. 55-90692 (corresponding to U.S. Pat. No. 4,258,543) and Japanese Utility Model Publication No. 58-48392 (corresponding to U.S. Pat. No. 4,333,306), the critical tension force is about 20 to 25 N (Newton). Such a critical tension force greatly degrades rubber permeability of the cord.

At the time of embedding of steel cords into rubber in the industrial fabrication of tires, a predetermined tension force is applied to cords when the cords are aligned or vulcanized. The tension force normlly falls within the range of 15 to 25 N. In a conventional open type steel cord, the tension force acting upon embedding of the cord in rubber is substantially equal to the critical tension force greatly influencing rubber permeability. For this reason, rubber permeability is degraded. As a result, improvements in durability and anti-fatigue properties of cords under the humid, corrosive circumstances cannot be expected.

Japanese Patent Disclosure (Kokai) No. 57-43866 (corresponding to U.S. Pat. No. 4,399,853) discloses a steel cord of an open type wherein elongation of the cord is kept within a predetermined range to prevent distortion of spiral pattern of the cord. However, in such a cord, since changes in elongation of the cord under the tension of 20 to 50 N were excessively large, errors occurred in the dimensions of cords during vulcanization. In addition, the modulus of a composite body of wires and rubber was undesirably changed.

SUMMARY OF THE INVENTION

It is, therefore, an object of the present invention to provide a rubber-reinforcing metal cord free from degradation of permeability of rubber at a tension force normally acting on the cord when wires are embedded in rubber.

It is another object of the present invention to provide a rubber-reinforcing open type metal cord capable of stabilizing elongation at low loads and of preventing degradation of breaking strength of the cord and the rubber composite.

An open type metal cord according to the present invention comprises a plurality of cord units each constituted by at least one preformed metal wire member. The wire members within a given cord unit have the same preforming ratio but have a different ratio from that of the wire members within another cord unit. A difference between the largest preforming ratio and the smallest preforming ratio in cord units falls within the range of 0.20 to 0.40. In this case, the maximum preforming ratio possible for the wire members is 1.65 and the minimum preforming ratio possible for the wire members is 1.05. A total number of wire members constituting a metal cord according to the present invention is 3 to 5.

DESCRIPTION OF THE PREFERRED EMBODIMENTS

Figure 1:
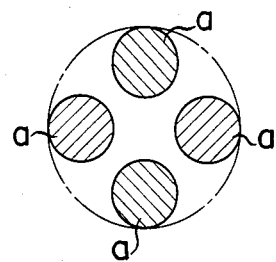
FIG. 1 is a sectional view showing a conventional open type steel cord.
Figure 2:
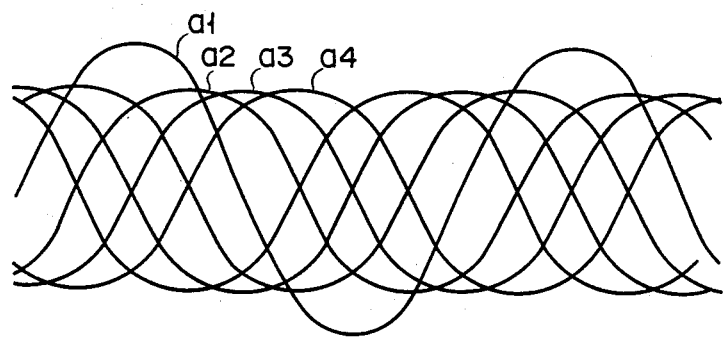
FIG. 2 is a front view of a metal cord according to an embodiment of the present invention.
Figure 3:
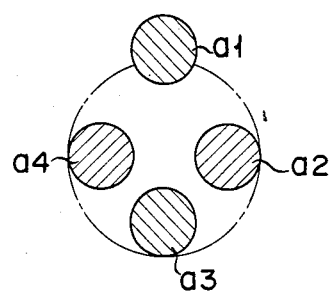
FIG. 3 is a sectional view of the cord in FIG. 2.

FIGS. 2 and 3 show a metal cord according to a first embodiment of the present invention. The metal cord is constructed such that four metal wires a1, a2, a3, and a4 are loosely twisted. Wire a1 constitutes one cord unit (a first cord unit), and remaining three wires a2, a3, and a4 constitute the other cord unit (a second cord unit). The wires constituting the second cord unit have the same preforming ratio which is smaller than the preforming ratio of wire a1 constituting the first cord unit. The wires are usually twisted at a twisting pitch of 30 times to 80 times the diameter of the wire.

The difference between the preforming ratios of the wire constituting the first cord unit and the wires constituting the second cord unit is set to fall within the range of 0.20 to 0.40. In this case, the maximum preforming ratio of the wire is set to be 1.65, and the minimum preforming ratio of the wire is set to be 1.05.

With this construction, a sufficient space is guaranteed between the adjacent wires when a tension force does not act thereon. Even if the tension force acts on the wires, a sufficient space for allowing permeation of rubber can be assured therebetween. Upon an application of a tension force, even if wires a2, a3, and a4 having a smaller preforming ratio get together, wire a1 having a larger preforming ratio does not come close to the remaining wires. Therefore, a sufficient space for allowing permeation of rubber is formed between wire a1 and the remaining wires. Rubber permeates into the cord through the above sufficient space, thereby preventing moisture or salt water from entering therein. As a result, corrosion of the cord can be prevented, and rubber product degradation caused by corrosion can be thus prevented.

Figure 4:
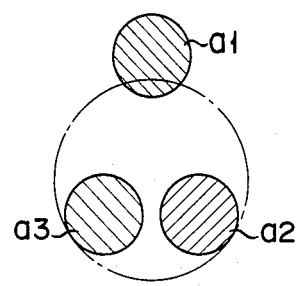
FIGS. 4 and 5 are sectional views showing metal cords according to other embodiments of the present invention, respectively.

FIG. 4 shows a cord constituted by three preformed metal wires according to another embodiment of the present invention. In this cord, wire a1 constitutes a first cord unit, and other two wires a2 and a3 constitute a second cord unit. The preforming ratio of the wire constituting the first cord unit is larger than that of each of the wires constituting the second unit.

Figure 5:
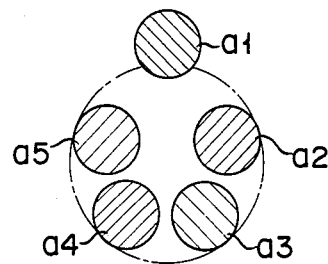

FIG. 5 shows a cord constituted by five metal wires according to still another embodiment of the present invention. Wire a1 constitutes a first cord unit, and other four wires a2, a3, a4, and a5 constitute a second cord unit. The preforming ratio of the wire constituting the first cord unit is larger than that of each of the wires constituting the second cord unit.

In the same manner as in the cord described with reference to FIGS. 2 and 3, a difference between the preforming ratio of the wire constituting the first cord unit and that of each of the wires constituting the second cord unit in each cord of FIG. 4 or 5 falls within the range of 0.20 to 0.40. In this case, the maximum preforming ratio of the wire is 1.65, and the minimum preforming ratio of the wire is 1.05. The same effect as described with reference to FIGS. 2 and 3 can be obtained in the cords of FIGS. 4 and 5.

The metal wires constituting the cord according to the pesent invention may be made of steel, which may be brass-plated. The diameter of each metal wire normally falls within the range of 0.15 to 0.38 mm.

The present invention will be described in detail by way of its examples below.

EXAMPLE 1

Various cords having the structure in FIGS. 2 and 3 were prepared by using steel wires having a diameter of 0.25 mm. The preforming ratios of the first and second cord units of the steel cords are shown in Table 1 below. The twisting pitch of each cord was 10.0 mm. Breaking strength, air permeability, and anti-fatigue properties of the resultant cords were tested, and the test results are summarized in Table 1.

The breaking strength test complied with ASTM D2969-83.

The air permeability test was performed in the following manner. Each cord was embedded in rubber, and rubber was vulcanized at a predetermined tension force. Air of 5 atms was forcibly supplied to one end of the cord, and a flow rate (cc/min) of air passing inside the cord along the longitudinal direction thereof was measured. A low flow rate indicates a high rubber permeability in the cord.

The anti-fatigue test was performed in the following manner. Each cord embedded in vulcanized rubber at a predetermined tension force was movably wound around two rollers disposed on an identical plane and one roller disposed at a level higher by 69 mm (the central point reference) than that of the two rollers between the two rollers. One end of the cord was fixed, and a counterweight was fixed to the other end of the cord through a guide roller. The three rollers and the guide roller were fixed to a support plate, and the support plate was reciprocated at a stroke of 82.6 mm. The number of times of reciprocation at the time of breaking of the cord was measured.

Figure 7:
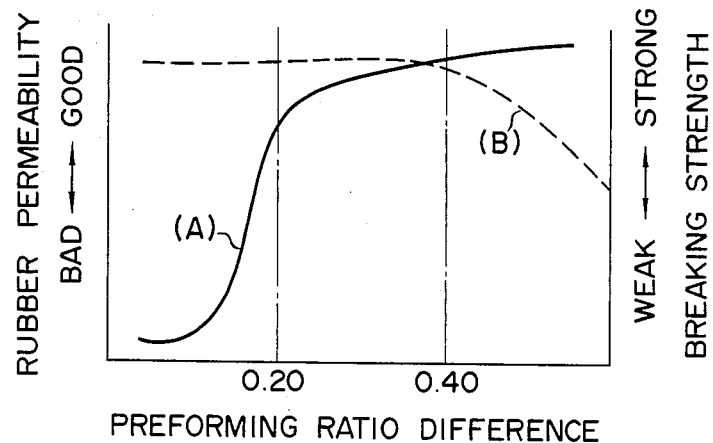
FIG. 7 is a graph showing the relationships of rubber permeability and cord breaking strength with a difference of preforming ratios of the wire members.
Figure 6A:
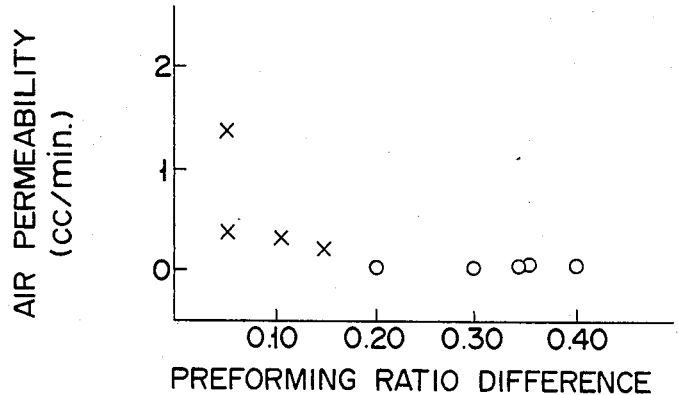
FIGS. 6A to 6C are respectively graphs showing the relationships between air permeability and differences of the preforming ratios of the wire members.
Figure 6B:
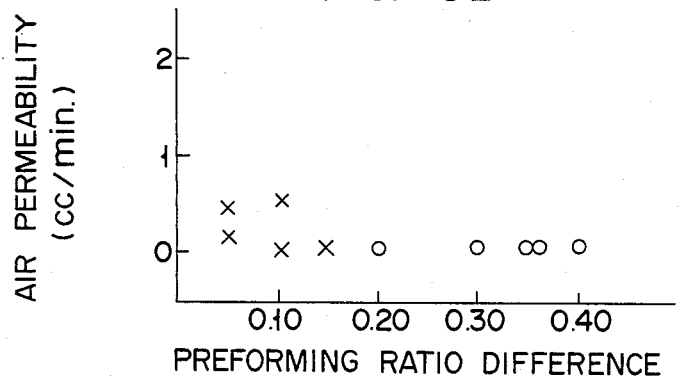
Figure 6C:
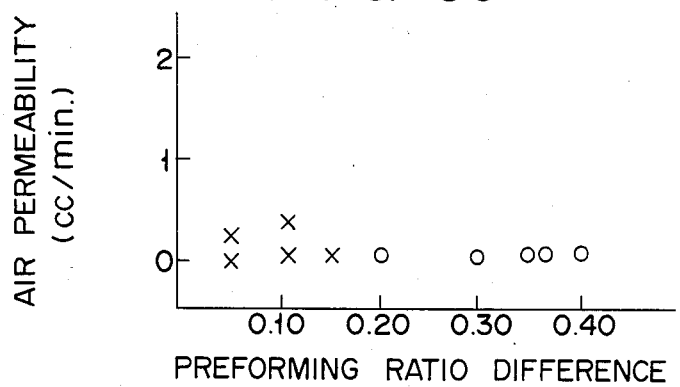

The relationships between the differences of preforming ratios and air permeability are shown in FIGS. 6A to 6C. More specifically, FIG. 6A shows the relationship when a tension force during vulcanization is 25 N. FIG. 6B shows the relationship when a tension force during vulcanization is 20 N, and FIG. 6C shows the relationship when a tension force during vulcanization is 15 N. Circles represent cords of the present invention and crosses represent cords having low rubber permeability in FIGS. 6A to 6C. The relationship between the differences of the preforming ratios, and rubber permeability and breaking strength under an application of a tension force is shown in FIG. 7.

TABLE 1

| Sample No | Cord Structure | Wire Preforming Ratio First Cord Unit | Wire Preforming Ratio Second Cord Unit | Difference | Cord Breaking Strength (N) | Air Permeability (cc/min) Tension Force of 15 N | Air Permeability (cc/min) Tension Force of 20 N | Air Permeability (cc/min) Tension Force of 25 N | Anti-Fatigue** Property (Cycle) |
|---|---|---|---|---|---|---|---|---|---|
| 1 | 1 × 4 × 0.25 | 1.10 | 1.05 | 0.05 | 520 | 0 | 0.5 | 1.4 | 3650 |
| 2 | 1 × 4 × 0.25 | 1.20 | 1.10 | 0.10 | 520 | 0.4 | 0.6 | 1.0 | 3590 |
| 3 | 1 × 4 × 0.25 | 1.25 | 1.10 | 0.15 | 510 | 0 | 0 | 0.2 | 3820 |
| 4 | 1 × 4 × 0.25 | 1.50 | 1.45 | 0.05 | 510 | 0.2 | 0.2 | 0.4 | 3670 |
| 5 | 1 × 4 × 0.25 | 1.60 | 1.50 | 0.10 | 500 | 0 | 0 | 0.3 | 3850 |
| 6 | 1 × 4 × 0.25 | 1.25 | 1.05 | 0.20 | 510 | 0 | 0 | 0 | 3920 |
| 7 | 1 × 4 × 0.25 | 1.45 | 1.15 | 0.30 | 510 | 0 | 0 | 0 | 3960 |
| 8 | 1 × 4 × 0.25 | 1.40 | 1.05 | 0.35 | 520 | 0 | 0 | 0 | 3970 |
| 9 | 1 × 4 × 0.25 | 1.60 | 1.25 | 0.35 | 510 | 0 | 0 | 0 | 4040 |
| 10 | 1 × 4 × 0.25 | 1.65 | 1.15 | 0.40 | 500 | 0 | 0 | 0 | 3960 |
| 11 | 1 × 4 × 0.25 | 1.65 | 1.05 | 0.50 | 440 | —* | — | — | — |
| 12 | 1 × 4 × 0.25 | 1.70 | 1.20 | 0.50 | 450 | —* | — | — | — |
| 13 | 1 × 4 × 0.25 | 1.80 | 1.20 | 0.60 | 400 | —* | — | — | — |

Note *Since cord breaking strength values of sample No. 11 to 13 were apparently decreased, they were judged as defective cords and the subsequent air permeability and anti-fatigue test were not performed for these samples.
Note **Anti-fatigue test conditions are a tension force of 20 N during vulcanization and a load of 50 N.

EXAMPLE 2

Various cords having the structure in FIG. 4 were prepared by using steel wires having a diameter of 0.38 mm. The preforming ratios of the first and second cord units in each cord are shown in Table 2 below. The twisting pitch of each cord was 19.0 mm. The breaking strength, air permeability, and anti-fatigue properties of each resultant cord were measured in the same manner as in Example 1, and measurement results are summarized in Table 2.

TABLE 2

| Sample No | Cord Structure | Wire Preforming Ratio | | | Cord Breaking Strength (N) | Air Permeability (cc/min) | | | Anti-Fatigue* Property (Cycle) |
|---|---|---|---|---|---|---|---|---|---|
| | | First Cord Unit | Second Cord Unit | Difference | | Tension Force of 15 N | Tension Force of 20 N | Tension Force of 25 N | |
| 1 | 1 × 3 × 0.38 | 1.25 | 1.05 | 0.20 | 845 | 0 | 0 | 0 | 1990 |
| 2 | 1 × 3 × 0.38 | 1.45 | 1.15 | 0.30 | 830 | 0 | 0 | 0 | 1980 |
| 3 | 1 × 3 × 0.38 | 1.40 | 1.05 | 0.35 | 840 | 0 | 0 | 0 | 2020 |
| 4 | 1 × 3 × 0.38 | 1.60 | 1.25 | 0.35 | 830 | 0 | 0 | 0 | 1950 |
| 5 | 1 × 3 × 0.38 | 1.65 | 1.15 | 0.50 | 780 | 0 | 0 | 0 | 1860 |

Note *Anti-fatigue test conditions are a tension force of 30 N during vulcanization and a load of 85 N.

EXAMPLE 3

Various cords having the structure in FIG. 5 were prepared by using steel wires having a diameter of 0.15 mm. The preforming ratios of the first and second cord units in each cord are shown in Table 3 below. The twisting pitch of each cord was 9.5 mm. The breaking strength, air permeability, and anti-fatigue properties of each resultant cord were measured in the same manner as in Example 1, and measurement results are summarized in Table 3.

TABLE 3

| Sample No | Cord Structure | Wire Preforming Ratio | | | Cord Breaking Strength (N) | Air Permeability (cc/min) | | | Anti-Fatigue* Property (Cycle) |
|---|---|---|---|---|---|---|---|---|---|
| | | First Cord Unit | Second Cord Unit | Difference | | Tension Force of 15 N | Tension Force of 20 N | Tension Force of 25 N | |
| 1 | 1 × 5 × 0.15 | 1.25 | 1.05 | 0.20 | 235 | 0 | 0 | 0 | 60,500 |
| 2 | 1 × 5 × 0.15 | 1.45 | 1.15 | 0.30 | 230 | 0 | 0 | 0 | 61,020 |
| 3 | 1 × 5 × 0.15 | 1.40 | 1.05 | 0.35 | 230 | 0 | 0 | 0 | 60,250 |
| 4 | 1 × 5 × 0.15 | 1.60 | 1.25 | 0.35 | 225 | 0 | 0 | 0 | 61,000 |
| 5 | 1 × 5 × 0.15 | 1.65 | 1.15 | 0.50 | 200 | 0 | 0 | 0 | 57,800 |

Note *Anti-fatigue test conditions are a tension force of 15 N during vulcanization and a load of 35 N.

As is apparent from the results in Tables 1 to 3 and FIGS. 6A to 7, if a preforming ratio difference is smaller than the minimum value in the prescribed range defined in the present invention, the wires in the cord come close to each other, and air permeability is increased. In other words, rubber permeability is decreased. The conventional open type cords belong to this category. On the contrary, high rubber permeabilities are obtained for the cords of the present invention at tension forces of 15 N, 20 N, and 25 N, and thus permeation of moisture or salt water can be prevented. However, if the preforming ratio exceeds 1.65, elongation of the cord is excessively increased even with small loads and becomes unstable, and a composite body of rubber and wires is not flat. When a preforming ratio exceeds 0.40, a load acting between the adjacent wires at a high tension force is nonuniform. As a result, breaking strength is decreased.

The present invention has been exemplified by the particular embodiments described above. However, the present invention is not limited to them. Various changes and modifications may be made within the spirit and scope of the invention. For example, the wire member comprises a wire but may be a strand. In the above embodiment, two cord units are used. However, three or more cord units may be used.

What is claimed is:
1. An open type metal cord comprising:
   a plurality of cord units each including at least one preformed metal wire member;
   said at least one preformed metal wire member of each of said respective cord units having the same preforming ratio, the preforming ratio of said at least one wire member of a given one of said plurality of cord units being different from that of said at least one wire member of another one of said plurality of cord units;
   a difference between the largest preforming ratio and the smallest preforming ratio of said preformed metal wire members falling within a range of 0.20 to 0.040;
   the maximum preforming ratio being 1.65, and the minimum preforming ratio being 1.05; and
   the total number of preformed metal wire members constituting said metal cord being 3 to 5.

2. A cord according to claim 1, comprising a first cord unit having only one preformed metal wire member and a second core unit having two to four preformed metal wire members, the preforming ratio of the wire member of said first cord unit being larger than the preforming ratios of the wire members of said second cord unit.

3. A cord according to claim 1, wherein at least one of said preformed metal wire members comprises a metal wire.

4. A cord according to claim 1, wherein at least one of said preformed metal wire members comprises a strand.

5. A cord according to claim 1, wherein at least one of said preformed metal wire members comprises steel wire.

6. A cord according to claim 1, wherein said wire members are twisted together at a twisting pitch of 30 to 80 times the diameter of the wire members.

* * * * *